P. EVANS.
OVERFLOW PIPE FOR INJECTORS.
APPLICATION FILED NOV. 14, 1917.
1,312,025.
Patented Aug. 5, 1919.
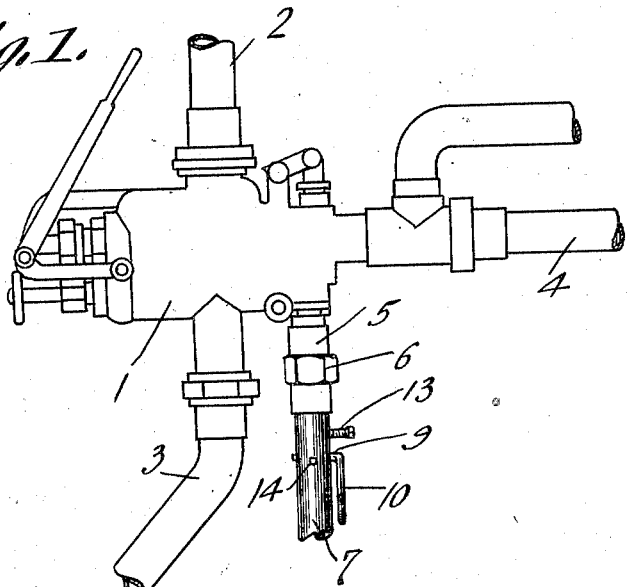
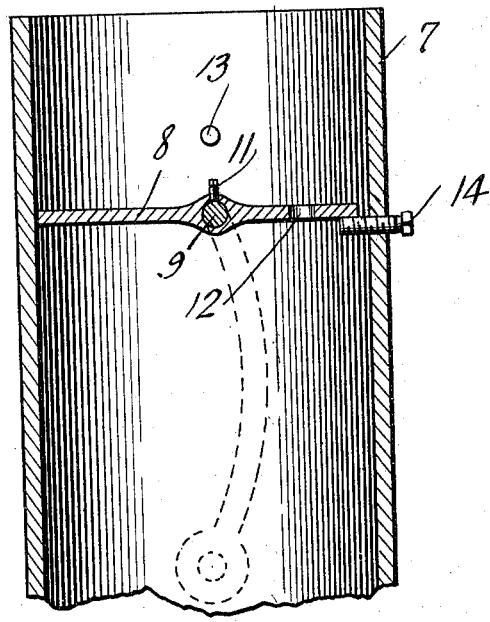
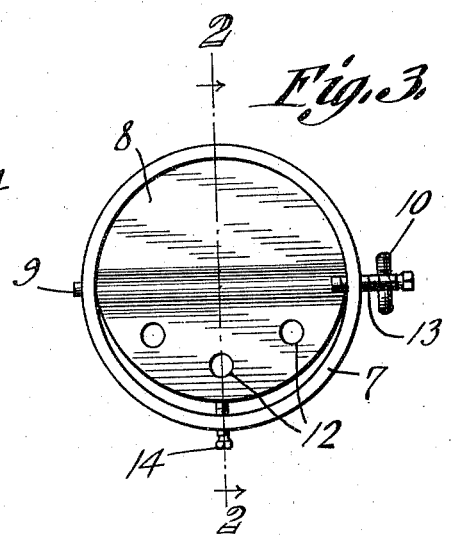
Pard Evans
Inventor

UNITED STATES PATENT OFFICE.

PURD EVANS, OF LEXINGTON, TENNESSEE, ASSIGNOR OF ONE-HALF TO S. L. HERNDON, OF LEXINGTON, TENNESSEE.

OVERFLOW-PIPE FOR INJECTORS.

1,312,025.

Specification of Letters Patent. Patented Aug. 5, 1919.

Application filed November 14, 1917. Serial No. 202,003.

*To all whom it may concern:*

Be it known that I, PURD EVANS, a citizen of the United States, residing at Lexington, in the county of Henderson and State of Tennessee, have invented a new and useful Overflow-Pipe for Injectors, of which the following is a specification.

The subject of this invention is an overflow pipe for injectors, and the objects of the invention are, first, to provide an overflow pipe that may be connected directly to the injector, second, to provide a trip valve for the overflow pipe, third, to provide a warning means operated by the valve, fourth, to provide an overflow in which the parts may be easily assembled, fifth, to provide a simple, durable, and efficient overflow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing wherein:

Figure 1 is a view in side elevation of an injector with an overflow constructed in accordance with the invention attached thereto:

Fig. 2 is an enlarged longitudinal section on the line 2—2 of Fig. 3;

Fig. 3 is a top plan view of the device.

Referring to the drawing by numerals of reference:

An ordinary form of injector is indicated at 1 to which is connected the steam inlet pipe 2; branch pipe 3; and boiler feed pipe 4. An overflow nipple 5 depends from a suitable portion of the injector.

Secured to the nipple 5 by means of the coupling nut 6 or otherwise, is a pipe 7 in which is mounted a normally horizontal butterfly valve 8.

The valve is mounted on a horizontal rod or stem 9 which is positioned eccentrically of the valve and which rocks in bearings formed in the pipe 7. One extending end of this rod or stem is bent to form a crank 10. A set screw 11 may be threaded into the valve 8 to clamp the same in place on the rod 9, and also serves as a means for holding the valve in position with pliers or the like while inserting the rod or stem. The valve 8 may also be provided with apertures in its smaller sector to permit water to flow through and assure the proper working of the valve.

A screw 13 may be threaded into the pipe 7, from which it extends radially outward for the purpose of forming a stop for the crank 10 on its upward swing.

Another screw 14 may be threaded through the pipe 7 to form a stop for the valve 8 as shown.

The operation of the device is as follows: The valve is normally retained in horizontal position by the weight of the crank 10, which just overbalances the valve. When water overflows the weight of the water will overbalance the valve 8 and move the crank 10, thereby giving notice of the fact that overflow is taking place. Excessive movement of the valve is prevented by the crank coming in contact with the stop 13.

Having thus described the invention, what is claimed as new and sought by Letters Patent, is:

1. An overflow for injectors comprising a pipe, an eccentrically mounted butterfly valve within the pipe, the valve having apertures situated to one side of the valve stem, the stem of the valve extending beyond the pipe in one direction, an indicator on the extending end of the stem, and stops for limiting the movement of the valve.

2. An overflow for injectors comprising a pipe, an eccentrically mounted butterfly valve within the pipe, said valve provided with means to permit flow of water therebeyond, an indicator connected to the valve and located without the pipe, and stops for limiting the movement of the valve.

3. An overflow for injectors comprising a pipe, an eccentrically mounted butterfly valve within the pipe, said valve being constructed to permit substantially half of the periphery thereof to engage the interior of the pipe, the remaining portion of the periphery being spaced from the interior of the pipe, when the valve is in its normal position, an indicator connected to the valve and located without the pipe, and means for limiting the movement of the valve.

In testimony that I claim the foregoing as my own, I have hereto affixed my signature in the presence of two witnesses.

PURD EVANS.

Witnesses:
GEO. H. MAXWELL,
G. BARTHOLOMEW.

Copies of this patent may be obtained for five cents each, by addressing the "Commissioner of Patents Washington, D. C."